United States Patent [19]

Vogl et al.

[11] 4,002,563
[45] Jan. 11, 1977

[54] REGULAR COPOLYAMIDES AS DESALINATION MEMBRANES

[75] Inventors: Otto F. Vogl, Amherst, Mass.; Donald R. Stevenson, Brunswick, Ohio

[73] Assignee: The United States of America as represented by the Secretary of the Interior, Washington, D.C.

[22] Filed: May 23, 1975

[21] Appl. No.: 580,444

Related U.S. Application Data

[62] Division of Ser. No. 471,513, May 20, 1974, Pat. No. 3,935,172.

[52] U.S. Cl. .......................... 210/23 H; 210/500 M
[51] Int. Cl.² .......................... B01D 13/00
[58] Field of Search .................... 210/500 M, 23 H; 260/78 R

[56] References Cited

UNITED STATES PATENTS

| | | | |
|---|---|---|---|
| 3,423,491 | 1/1969 | McLain et al. | 210/500 M X |
| 3,472,766 | 10/1969 | Rosenbaum | 210/500 M X |
| 3,526,588 | 9/1970 | Michaels et al. | 210/500 M X |
| 3,660,281 | 5/1970 | Tober | 210/500 M X |

*Primary Examiner*—Frank A. Spear, Jr.
*Attorney, Agent, or Firm*—William S. Brown; Donald R. Fraser

[57] ABSTRACT

Regular copolyamides of the formula

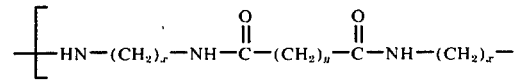
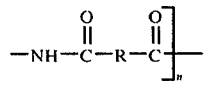

where $x$ is 2 to 10, $y$ is 0 to 8, R is a divalent aliphatic or aromatic radical having 1 to 34 carbon atoms, and $n$ is not less than 10, are prepared by reacting an aliphatic diester with an excess of an aliphatic diamine to form a diamine diamide, and reacting the diamine diamide intermediate with an aliphatic or aromatic diacid chloride.

Permselective membranes prepared from the copolyamides find particular utility in desalination of water by reverse osmosis.

4 Claims, No Drawings

REGULAR COPOLYAMIDES AS DESALINATION MEMBRANES

This is a division of application Ser. No. 471,513 filed May 20, 1974, now U.S. Pat. No. 3,935,172.

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes, and methods of preparing them, have been described in the prior art, e.g., in U.S. Pat. Nos. 3,133,132; 3,310,488; 3,344,214; 3,412,184; 3,439,074; 3,472,766; 3,497,451; 3,551,331; 3,567,632, and 3,585,125. These membranes are commonly cast from a solution comprising the membrane material and a solvent, with or without additional solution components such as water, swelling agents, etc. The membranes may be employed in the reverse osmosis process in the form of a free film or, more commonly, as a film deposited on a porous support material.

In particular, U.S. Pat. No. 3,567,632 describes a permselective polymeric membrane consisting of an aromatic condensation polymer with amide linkages, with all nonterminal

groups occurring in pairs, i.e., aromatic hydrazides. An additional requirement for the polymers is that at least one-half of the diacid residues be aromatic and at least two-thirds of the diamine residues be aromatic.

It has now been found that superior desalination membranes may be prepared from regular copolyamides having the formula

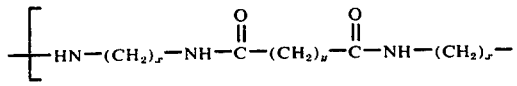

where $x$ is 2 to 10, and preferably 2 to 4, $y$ is 0 to 8, preferably 0 to 2, R is a divalent aliphatic or aromatic radical having 1 to 34 carbon atoms, and n is not less than 10. A particularly preferred copolyamide is one in which $x$ in the above formula is 2.

It has been known that polyamides can be prepared from diamines and diacid chloride derivatives. In the case of aliphatic amines, the free diacids and diacid chlorides have most commonly been used for this polymerization. In the case of aromatic diamines, the diacid chloride route is the only convenient way to prepare polyamides because aromatic diamines are weak bases and do not form salts with carboxylic acids, but rather dissociate and thereby interfere with polymer formation.

Regular polyamides of the structure (-A-B-A-D-), where A are diamines and B and D different diacid residues, have been described in the aromatic series. They could be prepared by reacting an aromatic diacid derivative with a nitro-aniline, isolating the dinitro-diamide and reducing the nitro groups to amino groups. This diamine-diamide was then reacted with a different diacid chloride to form regular aromatic copolyamides. Regular aromatic copolyamides show substantially different physical properties from either the homo polyamides or the random copolyamid, i.e., different melting points and solubilities.

Regular aliphatic copolyamides have not previously been prepared because under the normally employed polymerization conditions at elevated temperatures, trans-amidation occurs readily. This leads to randomization of the diacid and diamine residues, and a regular arrangement of diacid and diamine residues along the polymer chain cannot be maintained.

It has now been found, according to the present invention, that aliphatic regular copolyamides can be prepared by reacting an aliphatic diester with an excess of an aliphatic diamine, and subsequently reacting the intermediate diamine diamide product with an aliphatic diacid chloride. Or, the diamine diamide may be reacted with an aromatic diacid chloride to form a product in which R in the above formula is an aromatic radical.

Reactions involved in preparation of the copolyamides of the invention are illustrated by the following equations, in which the reactants are ethylene diamine, diethyloxalate and an aliphatic or aromatic diacid chloride.

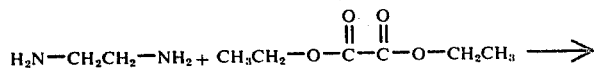

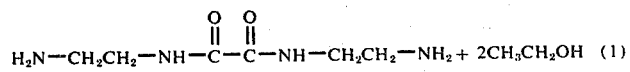

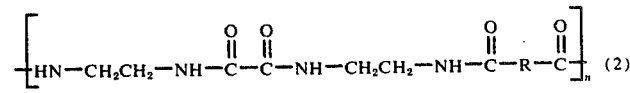

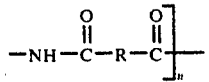

The aliphatic diester is an ester of an aliphatic dibasic acid containing 2 to 10 carbon atoms, and an aliphatic alcohol containing 1 to 10 carbon atoms. The diacid chloride is a chloride of a dibasic acid having about 3 to 36 carbon atoms. The acid may be aliphatic, aromatic, or heterocyclic. Examples of suitable dibasic acids are isophthalic, 2,6-pyridine dicarboxylic, succinic, adipic, sebacic, and C-36 "dimer acid".

The copolyamides of the invention are prepared by conventional solution polymerization or interfacial polymerization techniques. Preferred solvents for solution polymerization are dialkyl amides, e.g., dimethyl acetamide, dimethyl formamide, or dimethyl sulfoxide. The solvent should be as dry as possible; it should not contain more than about 0.1 percent water, to prevent hydrolysis of the acid chloride.

It has also been found that the addition of about 0.1 to 10 percent of lithium chloride to the solvent is desirable in order to ensure homogeneity of the polymerization mixture. Thus, an admixture of about 2 to 8 percent LiCl and dimethyl acetamide has been found to be a suitable solvent for most polymerizations. In some cases it has also been found that the polymerization is enhanced by the addition of about 0.1 to 2 percent equivalents of a strong base such as triethylamine, trimethylamine, or pyridine to the solvent mixture in order to neutralize any HCl that is formed during the reaction.

Optimum molecular weights and viscosities of the copolyamides may vary considerably, depending on the specific type of polymer and its specific application. However, a viscosity (in sulfuric acid) of about 0.3 to 5.0 is generally suitable.

Preparation of the polymers of the invention will be more specifically illustrated by the following examples.

EXAMPLE 1

N,N′-Bis(2-aminoethyl) oxamide monomer was prepared by reaction (1), above, according to the following procedure:

In a 5 liter, 3 neck flask fitted with a mechanical stirrer, addition funnel and soda, lime tube, was placed a mixture of ethylene-diamine (192 g, 3.2 mol) and 1400 ml of ligroine. Diethyl oxalate (117 g, 0.8 mol) dissolved in 800 ml of ligroine was added dropwise to the vigorously stirred mixture over a period of 5 hours. The temperature was maintained at 10° C by use of an ice bath. Precipitation of the reaction product occurred immediately. The mixture was stirred 24 hours, filtered, rinsed with ethyl ether and recrystallized from 1600 ml of THF (tetrahydrofuran) to give 77 g (56%) of the monomer, mp 108°–109° C.

A polymer of the formula

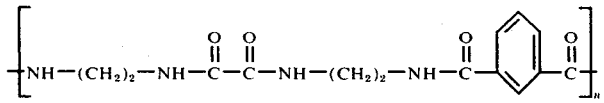

was then prepared by reaction (2), above, according to the procedure:

N,N′-Bis(2-aminoethyl) oxamide (32.0 g, 0.184 mol) and sodium carbonate (39.0 g, 0.368 mol) were dissolved in 1600 ml of water. 600 ml of this solution was placed in a one gallon Waring blender. Recrystallized isophthaloyl chloride (37.36 g, 0.184 mol dissolved in 1000 ml of chloroform and the remaining aqueous solutions were added at once to the blender and the cover placed on top. The mixture was blended at low setting for five minutes. The resulting white mass was filtered, rinsed with acetone, washed with 2000 ml of warm water, rinsed with acetone again, and finally dried at 3 mm at 60° C to give 55 g (99%) of polymer.

EXAMPLE 2

N,N′-Bis (3-aminopropyl) oxamide monomer was prepared by a procedure similar to that employed in preparation of the monomer of Example 1, as follows:

In a 3 liter, 3 neck flask fitted with mechanical stirrer, addition funnel and soda lime tube, was placed a mixture of 1,3 propylene diamine (148 g, 2.0 mol) and 1300 ml of ligroine. Diethyl oxalate (73 g, 0.5 mol) dissolved in 600 ml of ligroine was added dropwise to the vigorously stirred mixture over a period of 5 hours. The temperature was maintained at 20° C. Precipitation of the reaction product occurred immediately. The mixture was stirred 24 hours, filtered, rinsed with ethyl ether and recrystallized from 1800 ml THF to give 72 g (71%) of the monomer, mp 106° – 109° C.

A polymer of the formula

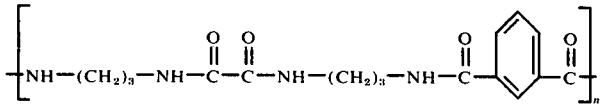

was then prepared by a procedure similar to that employed in preparation of the polymer of Example 1.

EXAMPLE 3

N,N′-Bis (4-aminobutyl) oxamide monomer was prepared by a procedure similar to that employed in preparation of the monomer of Example 1. The reaction temperature was maintained at 30° C, and the yield was 60%, mp 106°–108° C.

A polymer of the formula

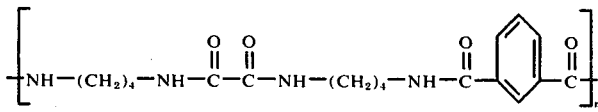

was then prepared by a procedure similar to that employed in preparation of the polymer of Example 1.

EXAMPLE 4

A polymer of the formula

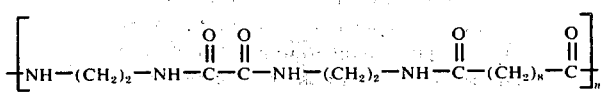

was prepared by a procedure similar to that of Example 1, except that sebcyl chloride was employed in place of the isophthaloyl chloride of Example 1.

EXAMPLE 5

A polymer of the formula

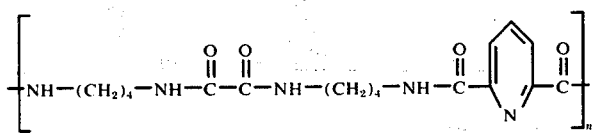

was prepared by a procedure similar to that of Example 3, except that pyridyl-2,6-dicarboxoyl chloride was employed in place of the isophthaloyl chloride of Example 3. The yield of polymer was near quantitative and it had an inherent viscosity of 0.88 in dimethylacetamide containing 3% lithium chloride.

EXAMPLE 6

A polymer was prepared by a procedure similar to that of Example 1, except that a mixture of tetrachloroterephthaloyl chloride (20 mole %) and terephthaloyl chloride (80 mole %) was employed in place of the isophthaloyl chloride of Example 1. The yield was near quantitative and the polymer had an inherent viscosity of 1.30 in sulfuric acid.

EXAMPLE 7

A polymer was prepared by a procedure similar to that of Example 2, except that a mixture of tetrachloroterephthaloyl chloride (20 mole %) and terephthaloyl chloride (80 mole %) was employed in place of the isophthaloyl chloride of Example 2. The yield was near quantitative and the polymer had an inherent viscosity of 1.90 in sulfuric acid.

EXAMPLE 8

A polymer was prepared by a procedure similar to that of Example 3, except that a mixture of tetrachloroterephthaloyl chloride (20 mole %) and terephthaloyl chloride (80 mole %) was employed in place of the isophthaloyl chloride of Example 3. The yield was near quantitative and the polymer had an inherent viscosity of 1.60 in sulfuric acid.

EXAMPLE 9

A polymer of the formula

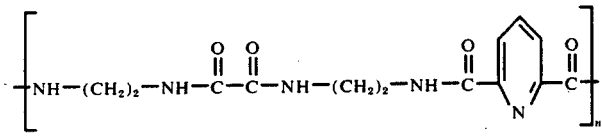

was prepared according to the following procedure:

To a 1-liter, three neck, round-bottom flask fitted with a mechanical stirrer, a gas inlet tube, and a reflux condenser was added 16 g of LiCl, 9.91 g (1 equivalent excess) of triethylamine, 5.69 g ($3.27 \times 10^{-2}$ mole) of the monomer of Example 1 and 400 ml of DMAc (dimethyl acetamide). The temperature was raised to 45°, and 6.67 g of 2,6-pyridine dicarboxylic acid chloride was added in proportions. After each proportion of the acid chloride was added, the temperature spontaneously rose to 50° and a white precipitate formed. After final addition (1 hour), the reaction mixture was stirred for an additional 18 hours at 55° C. When the mixture was poured into 800 ml of ice water, all the solid dissolved. After standing for a few minutes a precipitate reformed and was filtered. The solid was rinsed with acetone and ether and dried in an oven overnight. The resulting 2.33 g (23%) of white powder had a broad melting range −300°–350° C (dec). The inherent viscosity, measured in $H_2SO_4$, was 0.335.

EXAMPLE 10

A polymer was prepared by interfacial polymerization according to the procedure:

A solution containing 3.23 g ($1.64 \times 10^{-2}$ mol) of isophthaloyl chloride and 3.23 g ($1.64 \times 10^{-2}$ mol) of 2,6-pyridinedicarboxylic acid chloride in 250 ml of $CHCl_3$ was rapidly added to a one quart blender, maintained at high speed, containing 5.70 g ($3.28 \times 10^{-2}$ mol) of the monomer of Example 1 and 6.95 g of $Na_2CO_3$ in 350 ml of $H_2O$. The reaction was continued for one-half hour and then the solid was filtered off, washed three times with water, acetone, and ether, and placed in a vacuum oven. The white, finely-divided powder weighted 7.86 g (78.6%); mp 342°–368° C (dec).

Reverse osmosis membranes may be prepared from the polymers of the invention by conventional means such as casting a film of the polymer from a solution of the polymer in a suitable solvent, evaporating the solvent at a suitable rate and fixing the polymer by gelling with a suitable nonsolvent, usually water. Suitable solvents include dimethylacetamide, trifluoroacetic acid, and hexafluoroisopropanol. Concentrations of polymer in the solvent will generally range from about 2 to 10 percent. Initial reduction of the polymer to a fine powder, as by grinding, is usually desirable to facilitate dissolution. Heating, e.g., to a temperature of about 30° to 80° C may be desirable in effecting dissolution of the polymer.

The polymer solution is then cast on a smooth surface, such as glass, polished stainless steel, aluminum, mercury, etc., by conventional means. Generally, casting at room temperature by means of a glass rod or a doctor blade is effective. Suitable thickness of the cast film is generally about 500 to a few thousand angstroms.

Following casting, about five to 20 percent of the solvent is evaporated from the film. This may be done at room temperature or at an elevated temperature, e.g., about 70° to 100° C, where more rapid evaporation is desired. Optimum values for amount of solvent evaporated, temperature, and resulting time of evaporation, may vary widely depending on the specific polymer and solvent employed and the desired characteristics of the product membrane, and are best determined empirically.

The polymer film is then gelled by placing it in a non-solvent such as water, methanol, ethanol, acetone, or other solvents which have some miscibility with water, at a temperature of about 10° to 30° C for a period of one to 300 minutes. Again, optimum conditions are best determined experimentally.

The resulting permselective membranes may be used in conventional reverse osmosis processes, either as free films or, more commonly, as films mounted or deposited on a porous support material.

EXAMPLES 11-18

In these examples, the reverse osmosis properties of the polymers of Examples 1-8 were tested in a conventional high-pressure cell. In each case, 0.5 gram of the polymer, in powder form, was dissolved in 10 ml of dimethylacetamide, and the solution was pressure-filtered through a polypropylene filter (10$\mu$ m). In a dust-free, nitrogen-filled dry-box, the polymer solution was poured onto a clean glass plate and spread to a thickness of about 1-2 mil by means of a doctor blade. The solvent was allowed to evaporate for ten minutes at room temperature, and the plate was then placed in a water bath at 25° C, where the polymer film gelled and floated free of the glass plate.

The polymer film, about 0.1-10 mil. in thickness, was placed on a 5 mil. thick, 3-inch diameter cellulose acetate support and trimmed to the size of the support. Membrane and support were then mounted on a Whatman filter paper, using stainless steel frit as a backing, and placed in the test cell. Test conditions were 1000 psig, 10,000 ppm NaCl and 25° C. Results are shown in the following table:

Table 1

| Polymer of Example | Water Flux gfd | Salt Rejection % |
|---|---|---|
| 1 | 0.55 | 90.0 |
| 2 | 0.24 | 93.2 |
| 3 | 0.05 | 97.5 |
| 4 | 0.09 | 90.5 |
| 5 | 0.04 | 99.0 |
| 6 | 0.24 | 93.0 |
| 7 | 0.11 | 85.2 |
| 8 | 0.05 | 77.5 |

We claim:
1. In a process for desalination of saline water by reverse osmosis comprising contacting the saline water under pressure with a reverse osmosis membrane, the improvement comprising using as the reverse osmosis membrane a membrane comprising a film of a regular copolyamide consisting essentially of the repeating units:

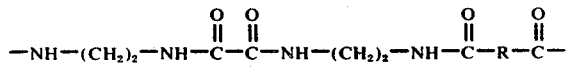

where R is selected from the group consisting of the isophthaloyl radical, the sebacyl radical and the pyridyl radical.

2. The process of claim 1 in which R is the isophthaloyl radical.

3. The process of claim 1 in which R is the sebacyl radical.

4. The process of claim 1 in which R is the 2,6-pyridyl radical.

* * * * *